US008331304B2

(12) United States Patent  (10) Patent No.: US 8,331,304 B2
Suzuki et al.  (45) Date of Patent: Dec. 11, 2012

(54) MOBILE COMMUNICATION METHOD, MOBILE STATION AND MOBILE SWITCHING CENTER

(75) Inventors: Keisuke Suzuki, Yokosuka (JP); Itsuma Tanaka, Yokohama (JP); Masashi Kanauchi, Yokosuka (JP)

(73) Assignee: NTT DoCoMo, Inc., Tokyo (JP)

( * ) Notice: Subject to any disclaimer, the term of this patent is extended or adjusted under 35 U.S.C. 154(b) by 90 days.

(21) Appl. No.: 13/057,908

(22) PCT Filed: Aug. 6, 2009

(86) PCT No.: PCT/JP2009/063947
§ 371 (c)(1),
(2), (4) Date: Apr. 21, 2011

(87) PCT Pub. No.: WO2010/016546
PCT Pub. Date: Feb. 11, 2010

(65) Prior Publication Data
US 2011/0188455 A1    Aug. 4, 2011

(30) Foreign Application Priority Data

Aug. 7, 2008  (JP) .................................. 2008-204885

(51) Int. Cl.
*H04W 4/00*  (2009.01)

(52) U.S. Cl. ...................... 370/329; 455/450; 455/456.2

(58) Field of Classification Search .................. None
See application file for complete search history.

(56) References Cited

U.S. PATENT DOCUMENTS

| 2008/0089272 | A1* | 4/2008 | Ahokangas | 370/328 |
| 2009/0268635 | A1* | 10/2009 | Gallagher et al. | 370/254 |
| 2010/0210218 | A1 | 8/2010 | Iwamura et al. | |

FOREIGN PATENT DOCUMENTS

| JP | 9-9357 A | 1/1997 |
| JP | 2006-197137 A | 7/2006 |
| JP | 2006-340294 A | 12/2006 |
| JP | 2007-281880 A | 10/2007 |
| WO | 2008023613 A1 | 2/2008 |

OTHER PUBLICATIONS

International Search Report w/translation from PCT/JP2009/063947 dated Sep. 8, 2009 (3 pages).
Japanese Office Action dated Sep. 1, 2009 and corresponding Japanese Application No. 2008-204885 (4 pages).

(Continued)

*Primary Examiner* — Jianye Wu
(74) *Attorney, Agent, or Firm* — Osha Liang LLP

(57) ABSTRACT

A mobile communication method according to the present invention includes the steps of: transmitting, to a mobile switching center MME/SGSN, a NAS connection establishment request for the specific communication, while an AS connection is established between the mobile station UE and a radio access network apparatus eNB/RNC; determining, at the mobile switching center MME/SGSN, to restrict establishment of the NAS connection for the specific communication, when the NAS connection establishment request signal is received and when a predetermined condition is satisfied; and restricting, at the mobile station UE, transmission of a first connection establishment request signal and transmission of the NAS connection establishment request signal, after reception of a rejection signal including a restriction time period for restricting establishment of the NAS connection for the specific communication until expiry of the restriction time period.

3 Claims, 9 Drawing Sheets

OTHER PUBLICATIONS

3GPP TS 24.301 V0.4.0; "3rd Generation Partnership Project; Technical Specification Group Core Network and Terminals; Non-Access-Stratum (NAS) Protocol for Evolved Packet System (EPS); Stage 3 (Release 8)"; Jul. 2008 (141 pages).

3GPP TS 36.331 V8.2.0; "3rd Generation Partnership Project; Technical Specification Group Radio Access Network; Evolved Universal Terrestrial Radio Access (E-UTRA) Radio Resource Control (RRC); Protocol specification (Release 8)"; May 2008 (151 pages).

3GPP TS24.008 V8.2.0; "3rd Generation Partnership Project; Technical Specification Group Core Network and Terminals; Mobile radio interface Layer 3 specification; Core network protocols; Stage 3 (Release 8)"; Jun. 2008 (553 pages).

3GPP TS 25.331 V8.3.0; "Radio Resource Control (RRC); Protocol specification"; May 2008 (1494 pages).

* cited by examiner

MOBILE COMMUNICATION METHOD, MOBILE STATION AND MOBILE SWITCHING CENTER

TECHNICAL FIELD

The present invention relates to a mobile communication method, a mobile station and a mobile switching center.

BACKGROUND ART

Nowadays, congestion in mobile communication networks is expected to occur more frequently due to introduction of flat-rate services. To address such a case, a mobile communication system may be configured to reject calls from a mobile station of a subscriber of a flat-rate service or a heavy user for the purpose of preservation of radio resource, but there is concern that the mobile station will repeatedly make calls after the rejection.

As a countermeasure for such concern, a mobile communication system of the 3GPP defines a scheme for temporarily stopping calls from a mobile station having failed in establishing a connection.

SUMMARY OF THE INVENTION

Problem to be Solved by the Invention

However, this scheme has a problem that it is only capable of restricting establishment of all connections by a specific mobile station.

In this regard, the present invention has been made in view of the above problem and has an objective to provide a mobile communication method, a mobile station and a mobile switching center which enable flexible call restriction.

Solution to Problem

A first aspect of the present invention is summarized as a mobile communication method for performing specific communication between a mobile station and a specific destination, including the steps of: (A) transmitting, to a mobile switching center, a second connection establishment request signal requesting establishment of a second connection for the specific communication between the mobile station and the mobile switching center, while a first connection is established between the mobile station and a radio access network apparatus; (B) determining, at the mobile switching center, to restrict establishment of the second connection for the specific communication, when the second connection establishment request signal is received and when a predetermined condition is satisfied; (C) transmitting, from the mobile switching center to the mobile station, a rejection signal including a restriction time period for restricting establishment of the second connection for the specific communication; and (D) restricting, at the mobile station, transmission of a first connection establishment request signal requesting establishment of the first connection for the specific communication and transmission of the second connection establishment request signal, after reception of the rejection signal until expiry of the restriction time period.

A second aspect of the present invention is summarized as a mobile station configured to perform specific communication with a specific destination, including: a second connection control unit configured to transmit a second connection establishment request signal to a mobile switching center, while a first connection is established with a radio access network apparatus, the second connection establishment request signal requesting establishment of a second connection for the specific communication with the mobile switching center; and a restriction processing unit configured to restrict transmission of a first connection establishment request signal requesting establishment of the first connection for the specific communication and transmission of the second connection establishment request signal, after reception of a rejection signal responding to the second connection establishment request signal until expiry of the restriction time period included in the rejection signal.

A third aspect of the present invention is summarized as a mobile switching center used in a mobile communication method for performing specific communication between a mobile station and a specific destination, including: a reception unit configured to receive, while a first connection is established between the mobile station and a radio access network apparatus, a second connection establishment request signal requesting establishment of a second connection for the specific communication with the mobile station; a restriction determination unit configured to determine to restrict establishment of the second connection for the specific communication, when the second connection establishment request signal is received and when a predetermined condition is satisfied; and a restriction information transmission unit configured to transmit a rejection signal to the mobile station, the rejection signal including a restriction time period for restricting establishment of the second connection for the specific communication.

Effects of the Invention

As has been described so far, the present invention is able to provide a mobile communication method, a mobile station and a mobile switching center which enable flexible call restriction.

MODES FOR CARRYING OUT THE INVENTION

Configuration of Mobile Communication System According to First Embodiment of Present Invention With reference to FIGS. 1 to 3, a description will be given of a configuration of a mobile communication system according to a first embodiment of the present invention.

Figure 1:
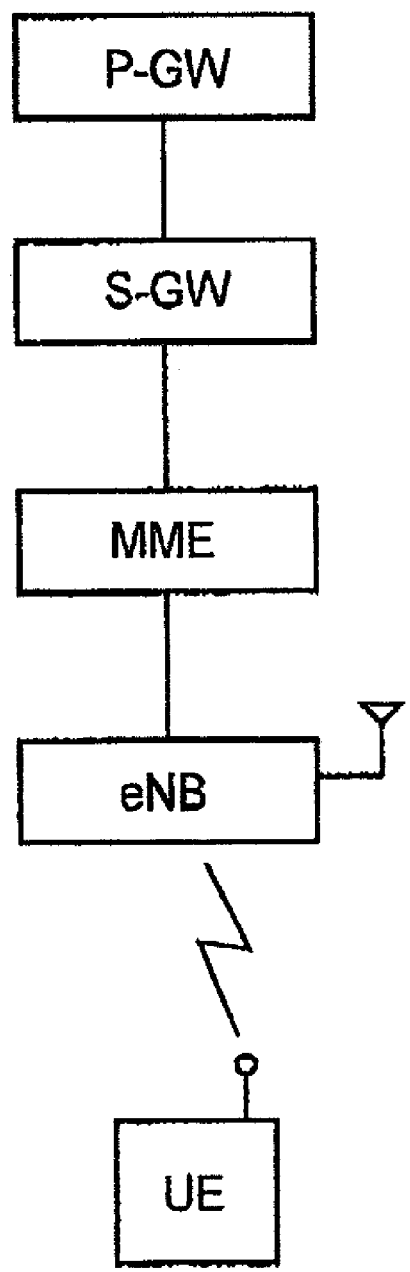
FIG. 1 is an entire configuration diagram of a mobile communication system according to a first embodiment of the present invention.

As shown in FIG. 1, the mobile communication system according to this embodiment is a mobile communication system of the LTE (Long Term Evolution) and includes a first gateway apparatus P-GW (PDN-Gateway), a second gateway apparatus S-GW (Serving-Gateway), a mobile switching center MME and a radio base station eNB.

Figure 2:
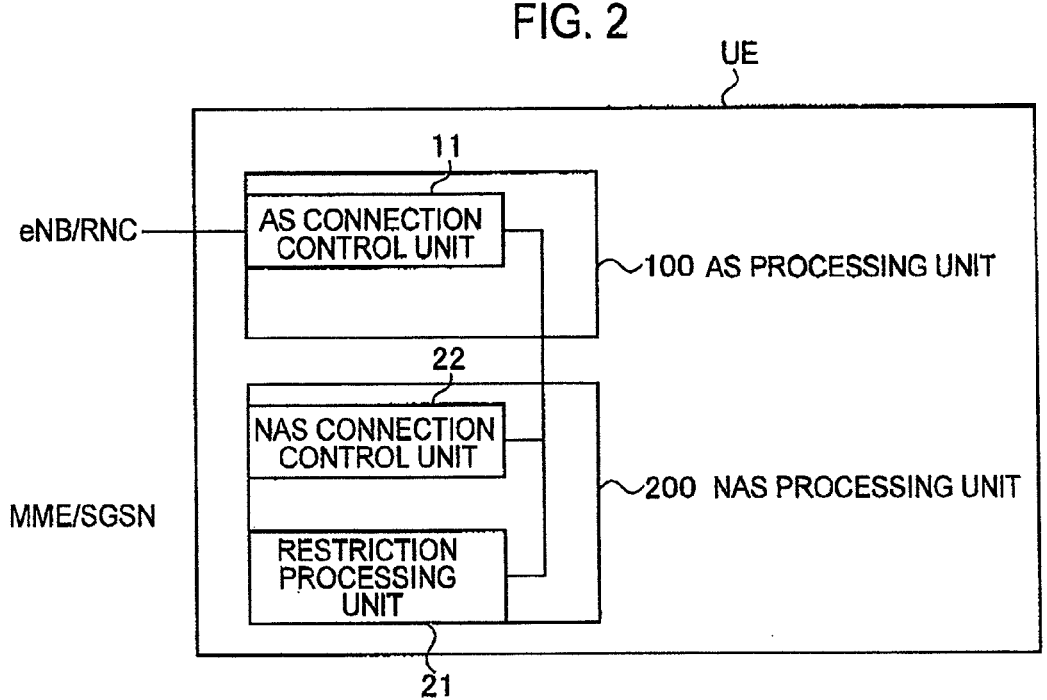
FIG. 2 is a functional block diagram of a mobile station according to the first embodiment of the present invention.

As shown in FIG. 2, a mobile station UE according to this embodiment includes an AS (Access Stratum) connection (first connection) control unit 11 as an AS processing unit 100, as well as a restriction processing unit 21 and a NAS (Non Access Stratum) connection (second connection) control unit 22 as a NAS processing unit 200.

The AS connection control unit 11 is configured to perform processing to establish an AS connection for specific communication between the mobile station UE and a specific destination APN. Here, an AS connection is a connection established between the mobile station UE and a radio base station eNB (radio access network apparatus).

The AS connection control unit 11 may also be configured to perform processing to establish an AS connection for the specific communication while a third connection for the specific communication is established (Preservation state) in a core network. Here, the third connection is established between the first gateway apparatus P-GW and the mobile switching center MME, for example.

The NAS connection control unit 22 is configured to transmit a NAS connection establishment request signal (PDN Connectivity Request/Service Request) for requesting the mobile switching center MME to establish a WAS connection for the specific communication between the mobile station UE and the mobile switching center MME, while an AS connection for the specific communication is established between the mobile station UE and the radio base station eNB.

The NAS connection control unit 22 may also be configured to transmit the NAS connection establishment request signal included in an AS connection establishment response signal (RRC Connection Setup Complete) transmitted to the radio base station eNB, in the processing to establish an AS connection for the specific communication.

The restriction processing unit 23 is configured to restrict transmission of an AS connection establishment request signal (RRC Connection Request) requesting establishment of an AS connection for the specific communication and of the NAS connection establishment request signal, after reception of a rejection signal (PDN Connectivity Reject/Service Reject) for the NAS connection establishment request signal until expiry of a restriction time period included in the rejection signal.

Note, however, that even before expiry of the restriction time period after reception of the rejection signal for the NAS connection establishment request signal, the AS connection control unit 11 can transmit the AS connection establishment request signal requesting establishment of an AS connection for emergency call, and the NAS connection control unit 22 can transmit the NAS connection establishment request signal requesting establishment of a NAS connection for emergency call.

Moreover, even before expiry of the restriction time period after reception of the rejection signal for the NAS connection establishment request signal, the AS connection control unit 11 can transmit the AS connection establishment request signal or the NAS connection establishment request signal to a destination other than the specific destination.

Figure 3:
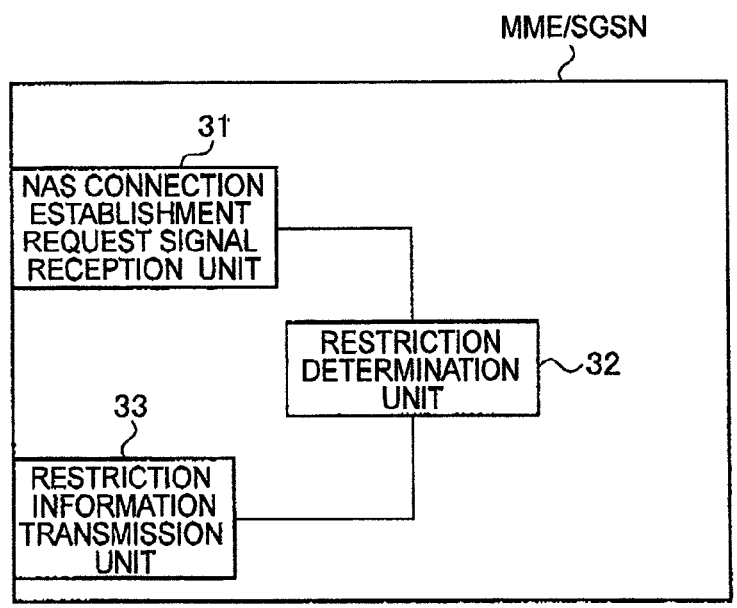
FIG. 3 is a functional block diagram of a mobile switching center according to the first embodiment of the present invention.

As shown in FIG. 3, the mobile switching center MME includes a NAS connection establishment request signal reception unit 31, a restriction determination unit 32 and a restriction information transmission unit 33.

The NAS connection establishment request signal reception unit 31 is configured to receive a NAS connection establishment request signal requesting establishment of a NAS connection for the specific communication with the mobile station UE, while an AS connection for the specific communication is established between the mobile station UE and the radio base station eNB.

The restriction determination unit 32 is configured to determine to restrict establishment of a NAS connection for the specific communication, when the NAS connection establishment request signal is received and a predetermined condition is satisfied.

For example, the restriction determination unit 32 may be configured to determine that a predetermined condition is satisfied in such a case as where a traffic amount or the number of calls of a specific mobile station during a predetermined time period exceeds a predetermined threshold.

The restriction determination unit 32 may also be configured to determine whether or not a predetermined condition is satisfied depending on contents of a contract, use conditions and the like of a user.

Note that the restriction determination unit 32 may be configured to restrict transmission of the AS connection establishment request signal and the NAS connection establishment request signal in the aforementioned manner, only in a case where the rejection signal for the NAS connection establishment request signal includes a specific "Cause value".

The restriction information transmission unit 33 is configured to transmit a rejection signal including a restriction time period to the mobile station UE, the rejection time period being set to restrict establishment of a NAS connection for the specific communication.

(Operation of Mobile Communication System according to First Embodiment of Present Invention)

Figure 4:
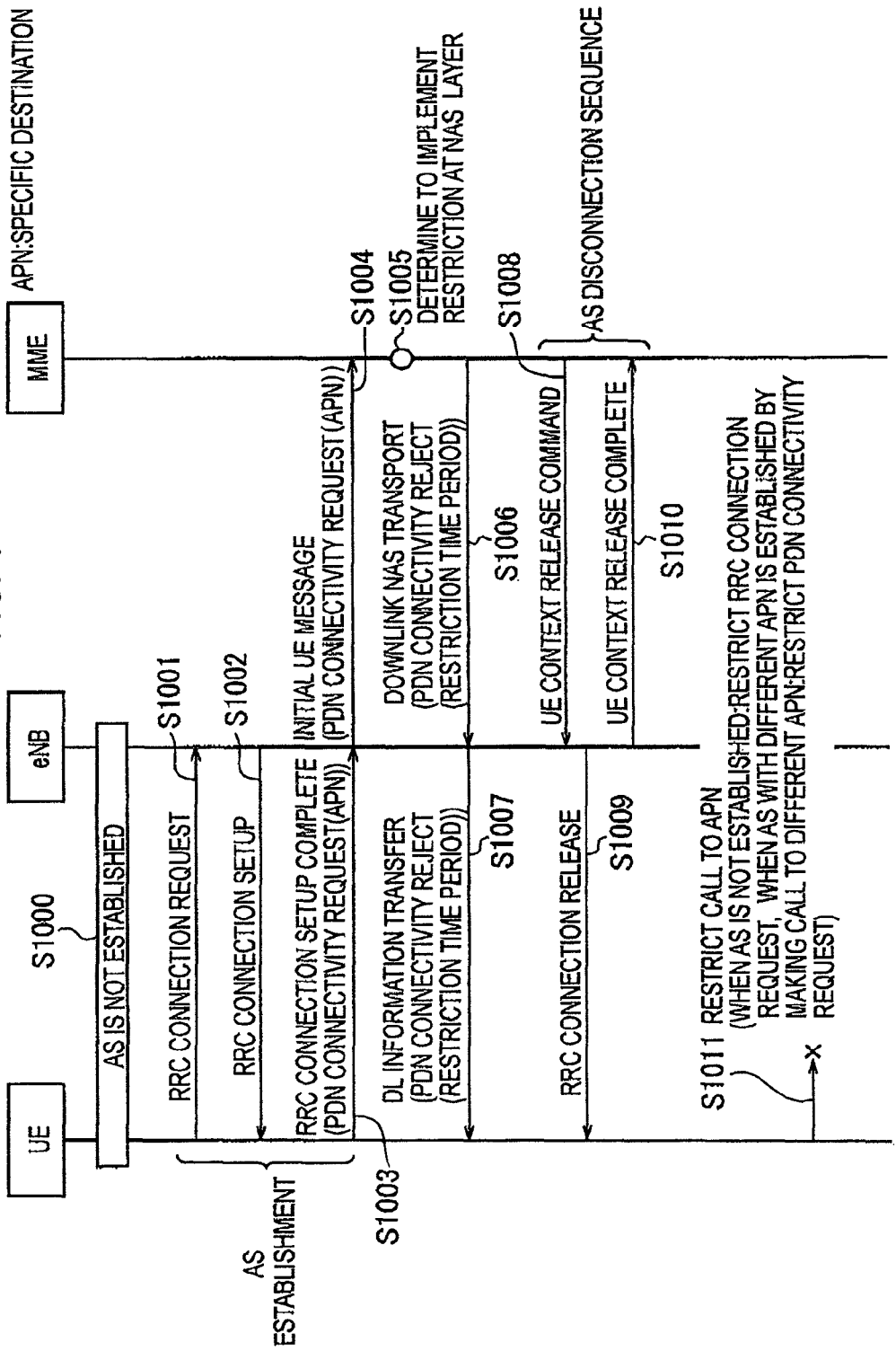
FIG. 4 is a sequence diagram showing an operation of the mobile communication system according to the first embodiment of the present invention.
Figure 5:
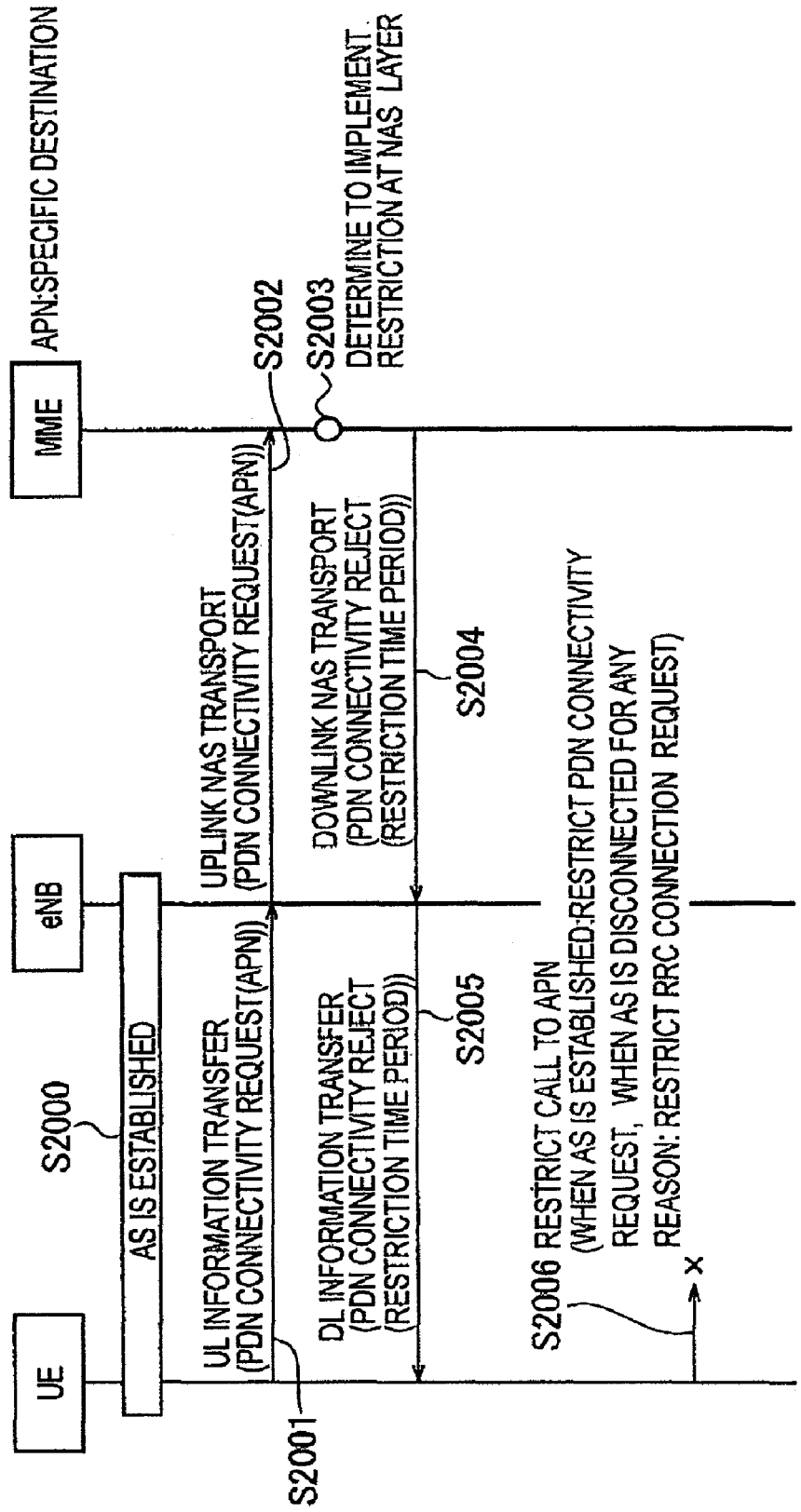
FIG. 5 is a sequence diagram showing an operation of the mobile communication system according to the first embodiment of the present invention.
Figure 6:
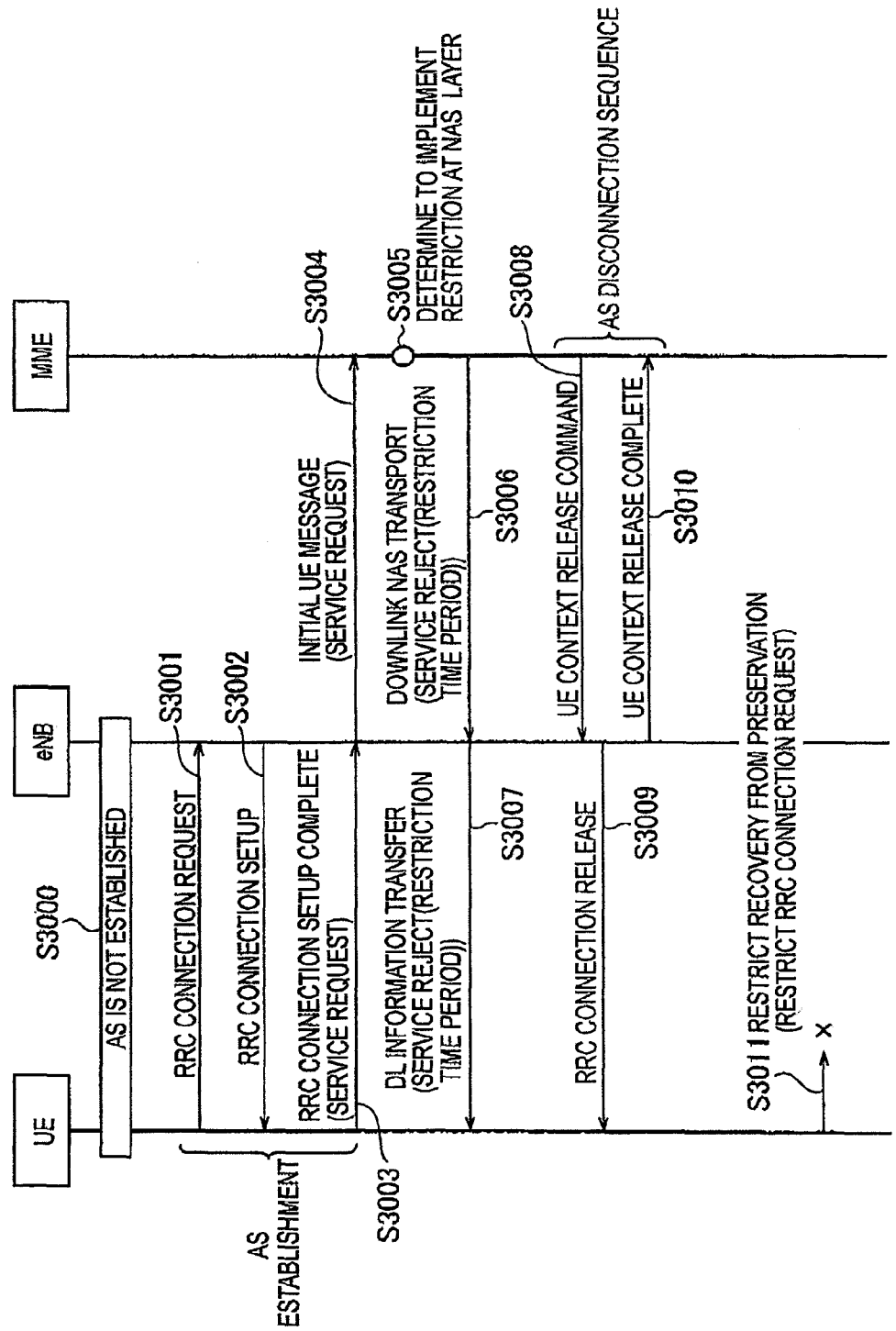
FIG. 6 is a sequence diagram showing an operation of the mobile communication system according to the first embodiment of the present invention.

With reference to FIGS. 4 to 6, a description will be given of an operation of the mobile communication system according to the first embodiment of the present invention.

Firstly, with reference to FIG. 4, a description will be given of an operation of restricting calls in a case where an AS connection is not established.

As shown in FIG. 4, in step S1001, the mobile station UE transmits an "RRC Connection Request (AS connection establishment request signal)" to the radio base station eNB, the "RRC Connection Request" being made to establish an AS connection for specific communication with a specific destination APN.

In step S1002, the radio base station eNB transmits an "RRC Connection Setup (AS connection establishment signal)" to the mobile station UE.

In step S1003, the mobile station UE transmits an "RRC Connection Setup Complete (AS connection establishment response signal)" to the radio base station eNB. At this point, an AS connection is established between the mobile station UE and the radio base station eNB.

Here, the mobile station UE transmits a "PDN Connectivity Request (NAS connection establishment request signal)" included in the "RRC Connection Setup Complete (AS connection establishment response signal)", the "PDN Connectivity Request" being made to establish a NAS connection for the specific communication with the specific destination APN.

In step S1004, the radio base station eNB transmits an "Initial UE Message" including the "PDN Connectivity Request (NAS connection establishment request signal)" to the mobile switching center MME.

In step S1005, the NAS function of the mobile switching center MME determines that a predetermined condition is satisfied, and determines to restrict calls from the mobile station UE.

In step S1006, the mobile switching center MME transmits a "Downlink NAS Transport" including a "PDN Connectivity Reject (rejection signal)" to the radio base station eNB. Here, the "PDN Connectivity Reject (rejection signal)" includes a restriction time period for restricting establishment of a NAS connection for the specific communication.

In step S1007, the radio base station eNB transmits a "DL Information Transfer" including the "PDN Connectivity Reject (rejection signal)" to the mobile station UE.

In step S1008, the mobile switching center MME transmits a "UE Context Release Command" to the radio base station eNB.

The radio base station eNS transmits an "RRC Connection Release (AS connection release request signal)" to the mobile station UE in step S1009, and transmits a "UE Context Release Complete" to the mobile switching center MME in step S1010. At this point, the AS connection between the mobile station UE and the radio base station eNB is disconnected.

In step S1011, the mobile station UE restricts calls to the aforementioned specific destination after reception of the "PDN Connectivity Reject (rejection signal)" until expiration of the aforementioned restriction time period.

Specifically, during this time period, the mobile station UE restricts transmission of an "RRC Connection Request (AS connection establishment request signal)" and transmission of a "PDN Connectivity Request (NAS connection establishment request signal)" (in a case where an AS connection for communication is established between the mobile station UE and a destination other than the specific destination APN).

Secondly, with reference to FIG. 5, a description will be given of an operation of restricting calls in a case where an AS connection is established.

As shown in FIG. 5, in step S2001, the mobile station UE transmits a "UL Information Transfer" including a "PDN Connectivity Request (NAS connection establishment request signal)" to the radio base station eNB, the "PAN Connectivity Request" being made to establish a NAS connection for the specific communication with the specific destination APN.

In step S2002, the radio base station eNB transmits an "Uplink NAS Transport" including the "PDN Connectivity Request (NAG connection establishment request signal)" to the mobile switching center MME.

In step S2003, the NAS function of the mobile switching center MME determines that a predetermined condition is satisfied, and determines to restrict calls from the mobile station UE.

In step S2004, the mobile switching center MME transmits a "Downlink NAS Transport" including a "PDN Connectivity Reject (rejection signal)" to the radio base station eNB. Here, the "PDN Connectivity Reject (rejection signal)" includes a restriction time period for restricting establishment of a NAS connection for the specific communication.

In step S2005, the radio base station eNB transmits a "DL Information Transfer" including a "PDN Connectivity Reject (rejection signal)" to the mobile station UE.

In step S2006, the mobile station UE restricts calls to the aforementioned specific destination after reception of the "PDN Connectivity Reject (rejection signal)" until expiry of the aforementioned restriction time period.

Specifically, during this time period, the mobile station UE restricts transmission of an "RRC Connection Request (AS connection establishment request signal)" (in a case where the AS connection is disconnected for any reason) and transmission of a "PDN Connectivity Request (NAS connection establishment request signal)" (in a case where the AS connection is established).

Thirdly, with reference to FIG. 6, a description will be given of an operation of restricting calls when recovering from the Preservation state.

As shown in FIG. 6, in step S3001, the mobile station UE transmits an "RRC Connection Request (AS connection establishment request signal)" to the radio base station eNE, the "RRC Connection Request" being made to establish an AS connection for specific communication with a specific destination APN.

In step S3002, the radio base station eNB transmits an "RRC Connection Setup (AS connection establishment signal)" to the mobile station UE.

In step S3003, the mobile station UE transmits an "RRC Connection Setup Complete (AS connection establishment response signal)" to the radio base station eNB. At this point, an AS connection is established between the mobile station UE and the radio base station eNB.

Here, the mobile station UE transmits a "Service Request (WAS connection establishment request signal)" included in the "RRC Connection Setup Complete (AS connection establishment response signal)", the "Service Request" being made to establish a NAS connection for the specific communication with the specific destination APN.

In step S3004, the radio base station eNB transmits an "Initial UE Message" including the "Service Request (WAS connection establishment request signal)" to the mobile switching center MME.

In step S3005, the NAS function of the mobile switching center MME determines that a predetermined condition is satisfied, and determines to restrict calls from the mobile station UE.

In step S3006, the mobile switching center MME transmits a "Downlink NAS Transport" including a "Service Reject (rejection signal)" to the radio base station eNB. Here, the "Service Reject (rejection signal)" includes a restriction time period for restricting establishment of a NAS connection for the specific communication.

In step S3007, the radio base station eNB transmits a "DL Information Transfer" including the "Service Reject (rejection signal)" to the mobile station UE.

In step S3008, the mobile switching center MME transmits a "UE Context Release Command" to the radio base station eNB.

The radio base station eNB transmits an "RRC Connection Release (AS connection release request signal)" to the mobile station UE in step S3009, and transmits a "UE Context Release Complete" to the mobile switching center MME in step S3010. At this point, the AS connection between the mobile station UE and the radio base station eNB is disconnected.

In step S3011; the mobile station UE restricts calls to the aforementioned specific destination after reception of the "Service Reject (rejection signal)" until expiry of the aforementioned restriction time period.

Specifically, during this time period, the mobile station UE restricts the recovery from the Preservation state, in other words, transmission of an "RRC Connection Request (AS connection establishment request signal)" (in a case where an AS connection is not established) and transmission of a "Service Request (NAS connection establishment request signal)" (in a case where an AS connection for communication is established between the mobile station UE and a destination other than the specific destination APN).

Instead of steps S3001 to S3004, the mobile station UE may transmit a "Tracking Area Update Request with an Active Flag" which is a location registration request signal including an AS connection establishment request signal, to the mobile switching center MME.

In this case, the "Service Request" in steps S3006 and S3007 is a "Tracking Area Update", and in step S3011 the mobile station UE may restrict transmission of the "Tracking Area Update" during the aforementioned restriction time period.

(Advantageous Effects of Mobile Communication System According to First Embodiment of Present Invention)

According to the mobile communication system of the first embodiment of the present invention, it is possible to restrict calls from the mobile station UE concerning only specific communication addressed to a specific destination APN.

First Modified Example

A description will be given of a first modified example of the present invention with reference to FIGS. 7 to 10. Hereinafter, the first modified example of the present invention will be described by focusing on differences from the aforementioned first embodiment.

Figure 7:
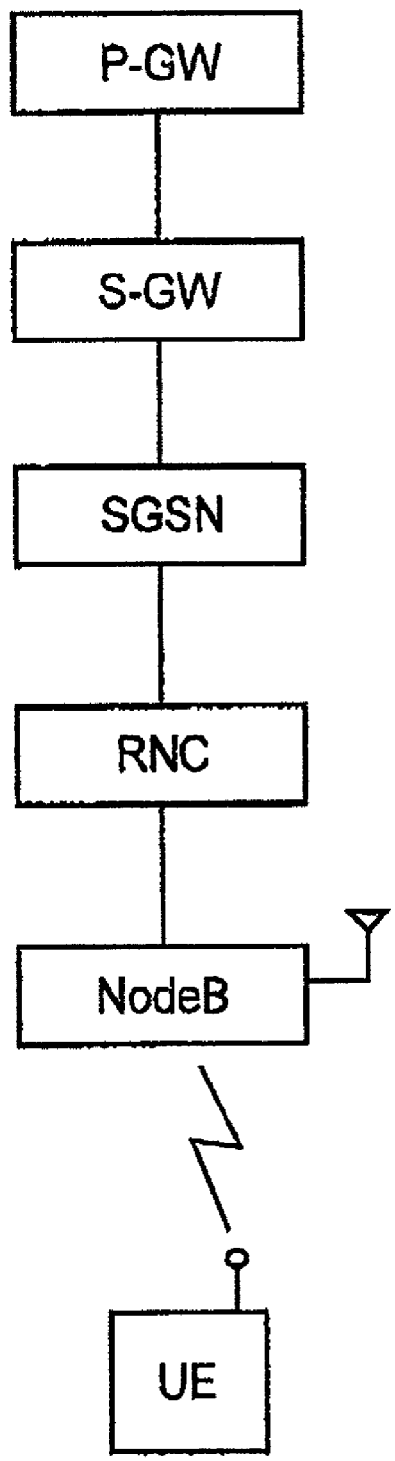
FIG. 7 is an entire configuration diagram of a mobile communication system according to a first modified example of the present invention.

As shown in FIG. 7, the mobile communication system according to the first modified example of the present invention is a mobile communication system of the WCDMA, and includes a first gateway apparatus P-GW, a second gateway apparatus S-GW, the mobile switching center SGSN, a radio control apparatus RNC and a radio base station NodeB.

Figure 8:
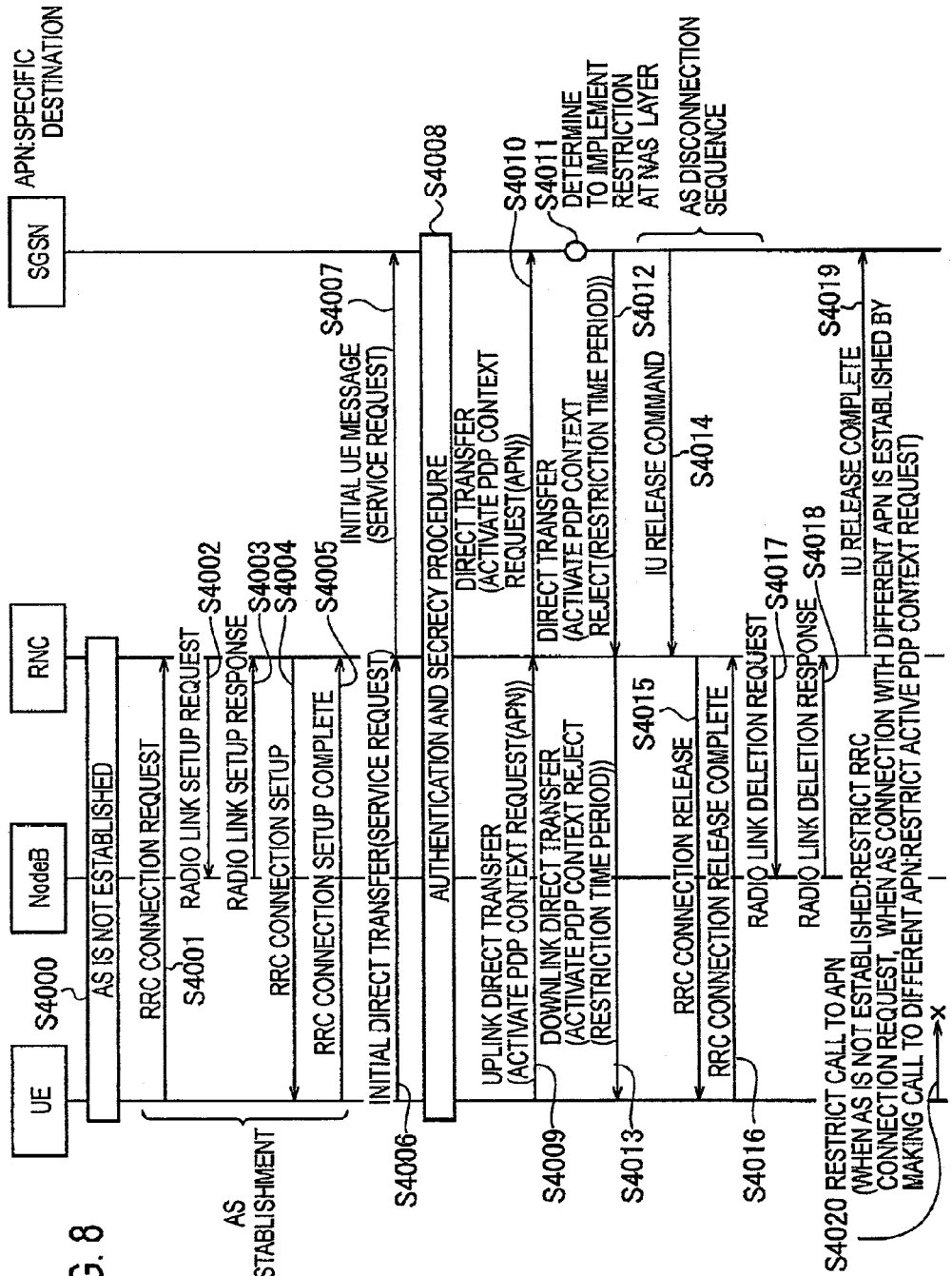
FIG. 8 is a sequence diagram showing an operation of the mobile communication system according to the first modified example of the present invention.
Figure 9:
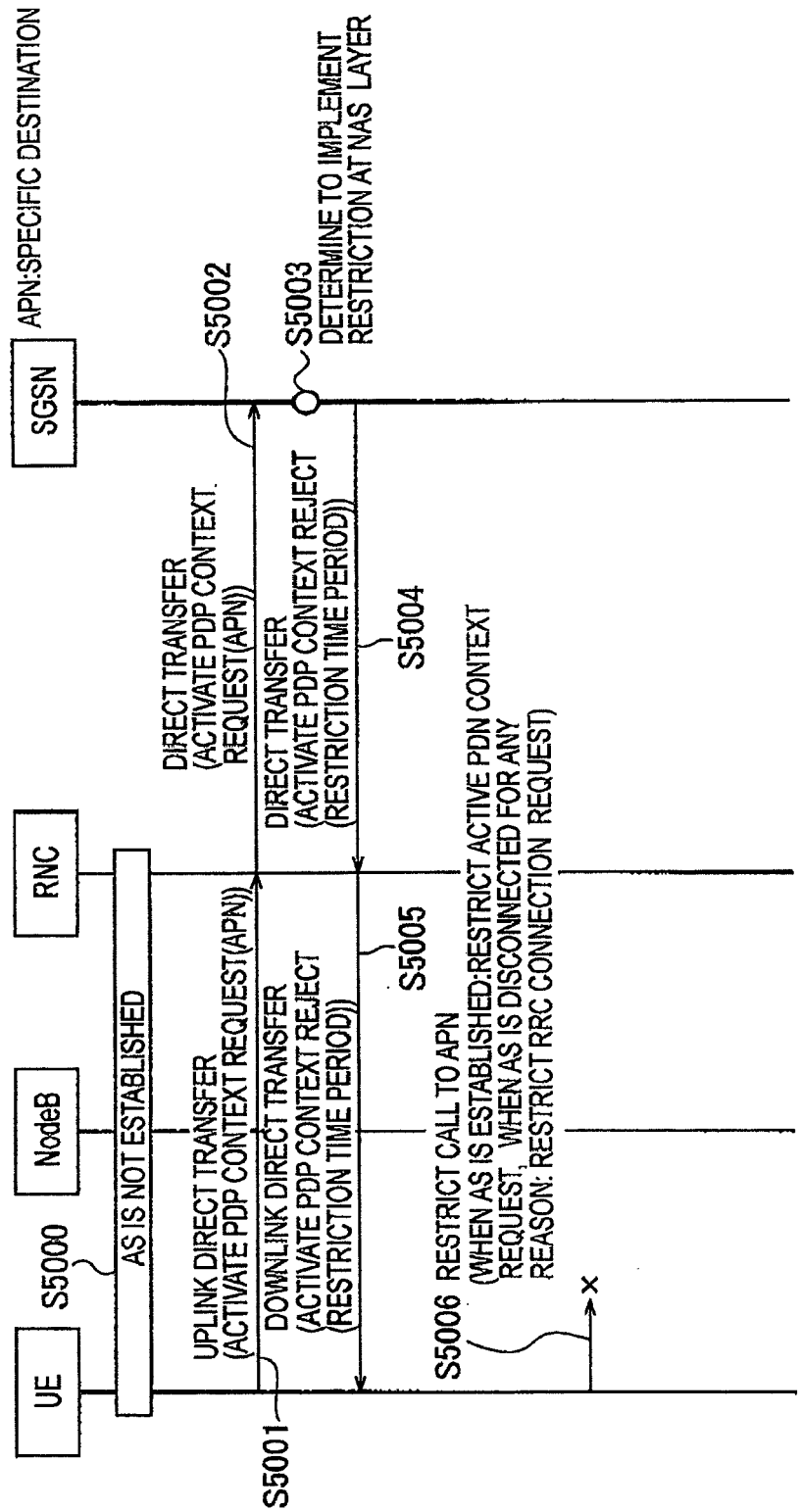
FIG. 9 is a sequence diagram showing an operation of the mobile communication system according to the first modified example of the present invention.
Figure 10:
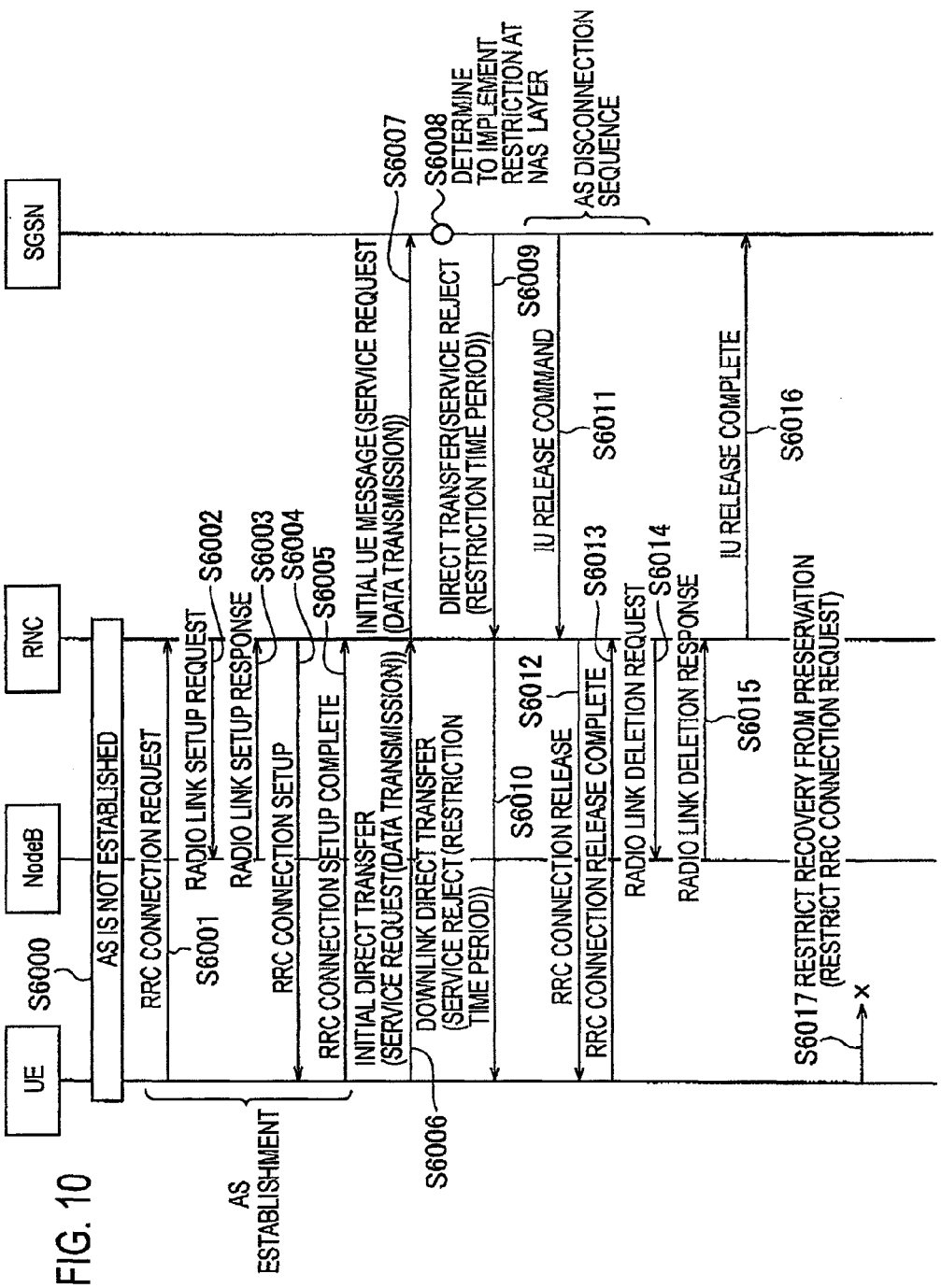
FIG. 10 is a sequence diagram showing an operation of the mobile communication system according to the first modified example of the present invention.

With reference to FIGS. 8 to 10, a description will be given of an operation of the mobile communication system according to the first modified example of the present invention.

Firstly, with reference to FIG. 8, a description will be given of an operation of restricting calls in a case where an AS connection is not established.

As shown in FIG. 8, in step S4001, the mobile station UE transmits an "RRC Connection Request (AS connection establishment request signal)" to the radio control apparatus RNC (radio access network apparatus), the "RRC Connection Request" being made to establish an AS connection for specific communication with a specific destination APN.

In step S4002, the radio control apparatus RNC transmits a "Radio Link Setup Request" to the radio base station NodeB. In step S4003, the radio base station NodeB transmits a "Radio Link Setup Response" to the radio control apparatus RNC.

In step S4004, the radio control apparatus RNC transmits an "RRC Connection Setup (AS connection establishment signal)" to the mobile station UE.

In step S4005, the mobile station UE transmits an "RRC Connection Setup Complete (AS connection establishment response signal)" to the radio control apparatus RNC. At this point, an AS connection is established between the mobile station UE and the radio control apparatus RNC.

In step S4006, the mobile station UE transmits an "Initial Direct Transfer" including a "Service Request" to the radio control apparatus RNC. In step S4007, the radio control apparatus RNC transmits an "Initial UE message" including the "Service Request" to the mobile switching center SGSN. In step S4008, an authentication and secrecy procedure is carried out between the mobile station UE and the mobile switching center SGSN.

In step S4009, the mobile station UE transmits an "Uplink Direct Transfer" including a "Activate PDP Context Request (NAS connection establishment request signal)" to the radio control apparatus RNC, the "Activate PDP Context Request" being made to establish a NAS connection for the specific communication with the specific destination APN.

In step 4010, the radio control apparatus RNC transmits the "Direct Transfer" including the "Activate PDP Context Request (NAS connection establishment request signal)" to the mobile switching center SGSN.

In step S4011, the NAS function of the mobile switching center SGSN determines that a predetermined condition is satisfied, and determines to restrict calls from the mobile station UE.

In step S4012, the mobile switching center SGSN transmits a "Direct Transfer" including an "Activate PDP Context Reject (rejection signal)" to the radio control apparatus RNC. Here, the "Activate PDP Context Reject (rejection signal)" includes a restriction time period for restricting establishment of a NAS connection for the specific communication.

In step S4013, the radio control apparatus RNC transmits a "Downlink Direct Transfer" including the "Activate PDP Context Reject (rejection signal)" to the mobile station UE.

In step S4014, the mobile switching center SGSN transmits an "Iu Release Command" to the radio control apparatus RNC.

The radio control apparatus RNC transmits an "RRC Connection Release (AS connection release request signal)" to the mobile station UE in step S4015, and receives an "RRC Connection Release Complete" from the mobile station 13E in step S4016.

Furthermore, the radio control apparatus RNC transmits a "Radio Link Deletion Request" to the radio base station NodeB in step S4017, and receives a "Radio Link Deletion Response" from the mobile station UE in step S4018.

The radio control apparatus RNS transmits an "Iu Release Complete" to the mobile switching center SGSN in step S4019. At this point, the AS connection between the mobile station UE and the radio control apparatus RNC is disconnected.

In step S4020, the mobile station UE restricts calls to the aforementioned specific destination after reception of the "Activate PDP Context Reject (rejection signal)" until expiry of the aforementioned restriction time period.

Specifically, during this time period, the mobile station UE restricts transmission of a "RRC Connection Request (AS connection establishment request signal)" (in a case where an AS connection is not established) and transmission of an "Activate PDP Context Request (NAS connection establishment request signal)" (in a case where an AS connection for communication is established between the mobile station UE and a destination other than the specific destination APN).

Secondly, with reference to FIG. 9, a description will be given of an operation of restricting calls in a case where an AS connection is established.

As shown in FIG. 9, in step S5001, the mobile station UE transmits an "Uplink Direct Transfer" including an "Activate PDP Context Request (NAS connection establishment request signal)" to the radio control apparatus RNC, the "Activate PDP Context Request" being made to establish a NAS connection for specific communication with the specific destination APN.

In step S5002, the radio control apparatus RNC transmits a "Direct Transfer" including the "Activate PDP Context Request (NAS connection establishment request signal)" to the mobile switching center SGSN.

In step S5003, the NAS function of the mobile switching center SGSN determines that a predetermined condition is satisfied, and determines to restrict calls from the mobile station UE.

In step S5004, the mobile switching center SGSN transmits a "Direct Transfer" including an "Activate PDP Context Reject (rejection signal)" to the radio control apparatus RNC. Here, the "Activate PDP Context Reject (rejection signal)" includes a restriction time period for restricting establishment of a NAS connection for the specific communication.

In step S5005, the radio control apparatus RNC transmits a "Downlink Direct Transfer" including the "Activate PDP Context Reject (rejection signal)" to the mobile station UE.

In step S5006, the mobile station UE restricts calls to the aforementioned specific destination after reception of the "Activate PDP Context Reject (rejection signal)" until expiry of the aforementioned restriction time period.

Specifically, during this time period, the mobile station UE restricts transmission of an "RRC Connection Request (AS connection establishment request signal)" (in a case where the AS connection is disconnected for any reason) and transmission of the "Activate PDP Context request (NAS connection establishment request signal)" (in a case where the AS connection is established).

Thirdly, with reference to FIG. 10, a description will be given of an operation of restricting calls when recovering from the Preservation state.

As shown in FIG. 10, in step S6001, the mobile station UE transmits an "RRC Connection Request (AS connection establishment request signal)" to the radio control apparatus RNC, the "RRC Connection Request" being made to establish an AS connection for specific communication with a specific destination APN.

In step S6002, the radio control apparatus RNC transmits a "Radio Link Setup Request" to the radio base station NodeB. In step S6003, the radio base station NodeB transmits a "Radio Link Setup Response" to the radio control apparatus RNC.

In step S6004, the radio control apparatus RNC transmits an "RRC Connection Setup (AS connection establishment signal)" to the mobile station UE.

In step S6005, the mobile station UE transmits an "RRC Connection Setup Complete (AS connection establishment response signal)" to the radio control apparatus RNC. At this point, an AS connection is established between the mobile station UE and the radio control apparatus RNC.

In step S6006, the mobile station UE transmits an "Initial Direct Transfer" including a "Service Request" to the radio control apparatus RNC. In step S6007, the radio control apparatus RNC transmits an "Initial UE message" including the "Service Request" to the mobile switching center SGSN.

In step S6008, the NAS function of the mobile switching center SGSN determines that a predetermined condition is satisfied, and determines to restrict calls from the mobile station UE.

In step S6009, the mobile switching center SGSN transmits a "Direct Transfer" including a "Service Reject (rejection signal)" to the radio control apparatus RNC. Here, the "Service Reject (rejection signal)" includes a restriction time period for restricting establishment of a NAS connection for the specific communication.

In step S6010, the radio control apparatus RNC transmits a "Downlink Direct Transfer" including the "Service Reject (rejection signal)" to the mobile station UE.

In step S6011, the mobile switching center SGSN transmits an "Iu Release Command" to the radio control apparatus RNC.

The radio control apparatus RNC transmits an "RRC Connection Release (AS connection release request signal)" to the mobile station UE in step S6012, and receives an "RRC Connection Release Complete" from the mobile station UE in step S6013.

In addition, the radio control apparatus RNC transmits a "Radio Link Deletion Request" to the radio base station NodeB in step S6014, and receives a "Radio Link Deletion Response" from the mobile station UE in step S6015.

In step S6016, the radio control apparatus RNC transmits an "Iu Release Complete" to the mobile switching center SGSN.

At this point, the AS connection between the mobile station UE and the radio control apparatus RNC is disconnected.

In step S6017, the mobile station UE restricts calls to the aforementioned specific destination after reception of the "Service Reject (rejection signal)" until expiry of the aforementioned restriction time period.

Specifically, during this time period, the mobile station UE restricts the recovery from the Preservation state, in other words, transmission of a "RRC Connection Request (AS connection establishment request signal)" (in a case where an AS connection is not established) and transmission of the "Service Request (NAS connection establishment request signal)" (in a case where an AS connection for communication is established between the mobile station UE and a destination other than the specific destination APN).

The features of the embodiment described above may be described as follows.

A first aspect of the embodiment is summarized as a mobile communication method for performing specific communication between a mobile station UE and a specific destination APN, including the steps of: (A) transmitting, to a mobile switching center MME/SGSN, a NAS connection establishment request signal (Activate PDP Context Request/PDN Conductivity Request/Service Request) requesting establishment of a NAS connection (second connection) for the specific communication between the mobile station UE and the mobile switching center MME/SGSN, while an AS connection (first connection) is established between the mobile station UE and a radio access network apparatus (the radio base station eNB and radio control apparatus RNC); (B) determining, at the mobile switching center MME/SGSN, to restrict establishment of the NAS connection for the specific communication, when the NAS connection establishment request signal is received and when a predetermined condition is satisfied; (C) transmitting, from the mobile switching center MME/SGSN to the mobile station UE, a rejection signal (Activate PDP Context Reject/PDN Connectivity Reject/Service Reject) including a restriction time period for restricting establishment of the NAS connection for the specific communication; and (D) restricting, at the mobile station UE, transmission of an AS connection establishment request signal (RRC Connection Setup Request) requesting establishment of the AS connection for the specific communication and transmission of the NAS connection establishment request signal, after reception of the rejection signal until expiry of the restriction time period.

In the first aspect of the embodiment, in the step (A), the mobile station UE may perform processing to establish the AS connection for the specific communication, and transmit the NAS connection establishment request signal (PDN Connectivity Request/Service Request) included in an AS connection establishment response signal (RRC Connection Setup Request) transmitted to the radio access network apparatus in the processing to establish the AS connection for the specific communication.

In the first aspect of the embodiment, in the step (A), the processing to establish the AS connection for the specific communication may be performed, while a third connection for the specific communication is established in a core network (in the Preservation state).

In the first aspect of the embodiment, in the step (A), the mobile station UE may perform the processing to establish the AS connection for the specific communication by transmitting a location registration request signal (Tracking Area Update Reject) including the AS connection establishment request signal, in a state (Preservation state) where the third connection for the specific communication is established in the core network; and in the step (D), the mobile station may restrict transmission of the location registration request signal after the reception of the rejection signal (Tracking Area Update Reject) until expiry of the restriction time period.

In the first aspect of the embodiment, a step of disconnecting the AS connection for the specific communication may be further included.

In the first aspect of the embodiment, in the step (D), the mobile station may be allowed to transmit an AS connection establishment request signal requesting establishment of an AS connection for emergency call, or to transmit a NAS connection establishment request signal requesting establishment of a NAS connection for emergency call.

A second aspect of the embodiment is summarized as a mobile station UE configured to perform specific communication with a specific destination APN, including: a NAS connection control unit 22 configured to transmit a NAS connection establishment request signal to a mobile switching center MME/SGSN, while an AS connection is established with a radio access network apparatus, the NAS connection establishment request signal requesting establishment of a NAS connection for the specific communication with the mobile switching center MME/SGSN; and a restriction processing unit 21 configured to restrict transmission of an AS connection establishment request signal requesting establishment of the AS connection for the specific communication and transmission of the NAS connection establishment request signal, after reception of a rejection signal responding to the NAS connection establishment request signal until expiry of the restriction time period included in the rejection signal.

In the second aspect of the embodiment, an AS connection control unit 11 configured to perform processing to establish the AS connection for the specific communication may be included; and the NAS connection control unit 22 may be configured to transmit the NAS connection establishment request signal included in an AS connection establishment response signal transmitted to the radio access network apparatus in the processing to establish the AS connection for the specific communication.

In the second aspect of the embodiment, the AS connection control unit 11 may be configured to perform the processing to establish the AS connection for the specific communication, while a third connection for the specific communication is established in a core network.

In the second aspect of the embodiment, the AS connection control unit 11 may be configured to perform the processing to establish the AS connection for the specific communication by transmitting a location registration request signal including the AS connection establishment request signal, while the third connection for the specific communication is established in the core network; and the restriction processing unit 21 may be configured to restrict transmission of the location registration request signal after the reception of the rejection signal until expiry of the restriction time period.

In the second aspect of the embodiment, even after the reception of the rejection signal responding to the NAS connection establishment request signal until expiry of the restriction time period, the AS connection control unit 11 may be allowed to transmit an AS connection establishment request signal requesting establishment of an AS connection for emergency call, and the NAS connection control unit 22 is allowed to transmit a NAS connection establishment request signal requesting establishment of a NAS connection for emergency call.

A third aspect of the embodiment is summarized as a mobile switching center MME/SGSN used in a mobile communication method for performing specific communication between a mobile station UE and a specific destination APN, including: a NAS connection establishment request signal reception unit 31 configured to receive, while an AS connection is established between the mobile station UE and a radio access network apparatus, a NAS connection establishment request signal requesting establishment of a NAS connection for the specific communication with the mobile station UE; a restriction determination unit 32 configured to determine to restrict establishment of the NAS connection for the specific communication, when the NAS connection establishment request signal is received and when a predetermined condition is satisfied; and a restriction information transmission unit 33 configured to transmit a rejection signal to the mobile station UE, the rejection signal including a restriction time period for restricting establishment of the NAS connection for the specific communication.

Note that operation of the above described mobile station UE and the mobile switching center MME/SGSN may be implemented by means of hardware, a software module executed by a processor, or a combination of both.

The software module may be provided in any type of storage medium such as an RAM (Random Access Memory), a flash memory, a ROM (Read Only Memory), an EPROM (Erasable Programmable ROM), an EEPROM (Electronically Erasable and Programmable ROM), a register, a hard disk, a removable disk, or a CD-ROM.

The storage medium is connected to the processor so that the processor can read and write information from and to the storage medium. Also, the storage medium may be integrated into the processor. Also, the storage medium and the processor may be provided in an ASIC. The ASIC may be provided in the mobile station UE and the mobile switching center MME/SGSN. Also, the storage medium and the processor may be provided in the mobile station UE and the mobile switching center MME/SGSN as a discrete component.

Hereinabove, the present invention has been described in detail using the above embodiment; however, it is apparent to those skilled in the art that the present invention is not limited to the embodiment described herein. Modifications and variations of the present invention can be made without departing from the spirit and scope of the present invention defined by the description of the scope of claims. Thus, what is described herein is for illustrative purpose, and has no intention whatsoever to limit the present invention.

The invention claimed is:

1. A mobile communication method comprising the steps of:
   transmitting, from a mobile station to a radio access network apparatus, an AS connection establishment response signal in a procedure for establishing an AS connection between the mobile station and the radio access network apparatus, the AS connection establishment response signal including a NAS connection establishment request signal, which is transmitted to a mobile switching center, for establishing a NAS connection for specific communication between the mobile station and a specific destination;
   transmitting, from the radio access network station to the mobile switching center, the NAS connection establishment request signal;
   transmitting, from the mobile switching center to the radio access network apparatus, a rejection signal in response to the NAS connection establishment request signal, the rejection signal including restriction time period and rejecting the establishment of the NAS connection;
   transmitting, from the radio access network apparatus to the mobile station, the rejection signal including the restriction time period; and
   restricting, at the mobile station, the transmission of the NAS connection establishment signal after the mobile station receives the rejection signal until expiry of the restriction time period.

2. A mobile station comprising:
   a NAS connection control unit configured to transmit an AS connection establishment response signal to a radio access network apparatus in a procedure for establishing an AS connection with the radio network apparatus, the AS connection establishment response signal including a NAS connection establishment request signal, which is transmitted to a mobile switching center, for establishing a NAS connection for specific communication with a specific destination;
   a restriction processing unit configured to restrict the transmission of the NAS connection establishment request signal after reception of the rejection signal for the NAS connection establishment request signal until expiry of restriction time period included in the rejection period.

3. A mobile switching center comprising:
   a NAS connection establishment request signal reception unit configured to receive a NAS connection establishment request signal, which is transmitted to the mobile switching center, for establishing a NAS connection for specific communication between a mobile station and a specific destination, from a radio access network apparatus in a procedure for establishing an AS connection with the mobile station and the radio access network apparatus; and
   a restriction information transmission unit configured to transmit a rejection signal for rejecting the establishment of the NAS connection to the radio access network apparatus in response to the NAS connection establishment request signal, the rejection signal including restriction time period indicating a period during which the mobile station restricts the transmission of the NAS connection establishment request signal after reception of the rejection signal.

* * * * *